United States Patent [19]

Latorella

[11] 4,103,395
[45] Aug. 1, 1978

[54] SHELL FISH TOOL

[76] Inventor: William Latorella, 61 Gourley Rd., Medford, Mass. 02155

[21] Appl. No.: 821,691

[22] Filed: Aug. 4, 1977

[51] Int. Cl.² .............................................. A22C 29/00
[52] U.S. Cl. ............................................ 17/71; 17/75
[58] Field of Search ................... 17/66, 70, 71, 74, 75, 17/76

[56] References Cited

U.S. PATENT DOCUMENTS 3,395,421  8/1968  Harless, Jr. ............................... 17/71

FOREIGN PATENT DOCUMENTS 25,386  12/1883  Fed. Rep. of Germany .............. 17/71

Primary Examiner—Willie G. Abercrombie

[57] ABSTRACT

A shell fish tool comprising first and second lever units pivotally connected to each other, each lever unit comprising an elongated handle portion, a shoulder portion, and an elongated jaw portion, the jaw portions comprising a first jaw portion of the first lever unit and a second jaw portion of the second lever unit, the first jaw portion having a sectional configuration including a first circular convex outside wall, a first rounded convex inside wall, and a second rounded convex inside wall, the first and second inside walls each extending at one end thereof from the first outside wall and each joining the other at the other end thereof to form a sharp angle depression in the first jaw, the first and second inside walls forming a first jaw face, the second jaw portion having a sectional configuration including a second circular convex outside wall, a third rounded concave inside wall and a fourth rounded concave inside wall, the third and fourth inside walls each extending at one end thereof from the second outside wall and each joining the other at the other end thereof to form a sharp angle protrusion in the second jaw, the third and fourth inside walls forming a second jaw face, the first and second jaw faces being complementarily shaped and engageable with each other, the first and second outside walls defining in section a complete circle when the first and second faces are engaged.

6 Claims, 3 Drawing Figures

SHELL FISH TOOL

BACKGROUND OF THE INVENTION

1. Field of the Invention

This invention relates to a shell fish tool and is directed more particularly to a tool having unique jaws for gripping and cracking lobster and crab shells, claws, and the like.

2. Description of the Prior Art

In the enjoyment of lobsters, crabs, and the like, it is necessary to separate the meat from the hard shell portions thereof. Various tools have been designed to assist in this endeavor, as for example, those shown in U.S. Pat. Nos. 3,071,802, issued Jan. 8, 1963, to F. Gambardella, and 3,395,421, issued Aug. 6, 1968, to C. L. Harless, Jr.

SUMMARY OF THE INVENTION

An object of the present invention is to provide an improved shell fish tool to assist in the separation of the meat of shell fish from the shells attached thereto.

A further object of the invention is to provide such a device having a unique configuration of jaws found helpful in the cracking and separating endeavors.

A still further object of the invention is to provide such a device as is simple in manufacture and relatively easy to use.

With the above and other objects in view, as will hereinafter appear, a feature of the present invention is the provision of a shell fish tool comprising first and second lever units pivotally connected to each other, each lever unit comprising an elongated handle portion, a shoulder portion, and an elongated jaw portion, the jaw portions comprising a first jaw portion of the first lever unit and a second jaw portion of the second lever unit, the first jaw portion having a sectional configuration including a first circular convex outside wall, a first rounded convex inside wall, and a second rounded convex inside wall, the first and second inside walls each extending at one end thereof from the first outside wall and each joining the other at the other end thereof to form a sharp angle depression in the first jaw, the first and second inside walls forming a first jaw face, the second jaw portion having a sectional configuration including a second circular convex outside wall, a third rounded concave inside wall and a fourth rounded concave inside wall, the third and fourth inside walls each extending at one end thereof from the second outside wall and each joining the other at the other end thereof to form a sharp angle protrusion in the second jaw, the third and fourth inside walls forming a second jaw face, the first and second jaw faces being complementarily shaped and engageable with each other, the first and second outside walls defining in section a complete circle when the first and second faces are engaged.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENT

Figure 1:
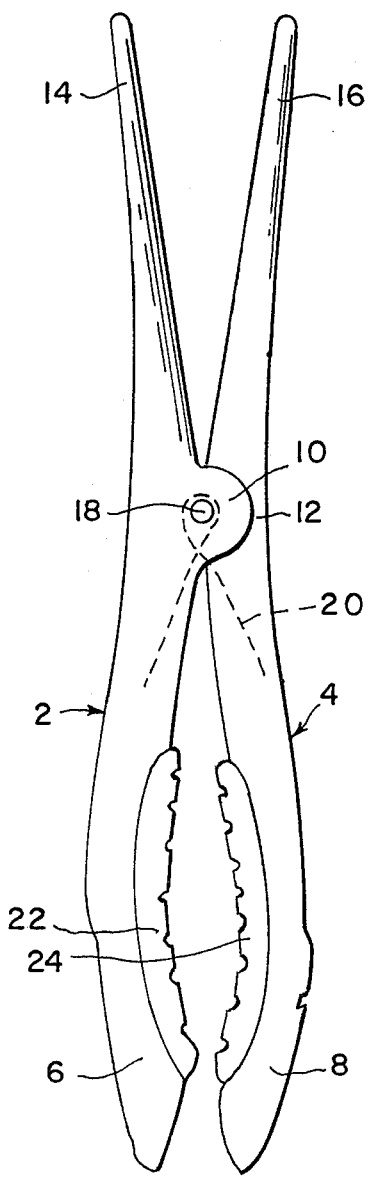
FIG. 1 is a front elevational view of one form of shell fish tool illustrative of an embodiment of the invention.

Referring to the drawings, it will be seen that the illustrative tool includes first and second lever units 2, 4 pivotally connected to each other, each lever unit 2, 4 comprising an elongated handle portion 6, 8, a shoulder portion 10, 12, and an elongated jaw portion 14, 16. The lever units 2, 4 are preferably connected to each other by pivotal means 18 disposed at their shoulder portions 10, 12. Preferably, there is disposed between the lever units 2, 4 and in the vicinity of the pivot means 18 a spring means 20 operable to bias the lever units 2, 4 in a first position, shown in FIG. 2.

The handle portions 6, 8 are provided with cracker portions 22, 24 which can be used to crack the shells of shell fish.

Figure 2:
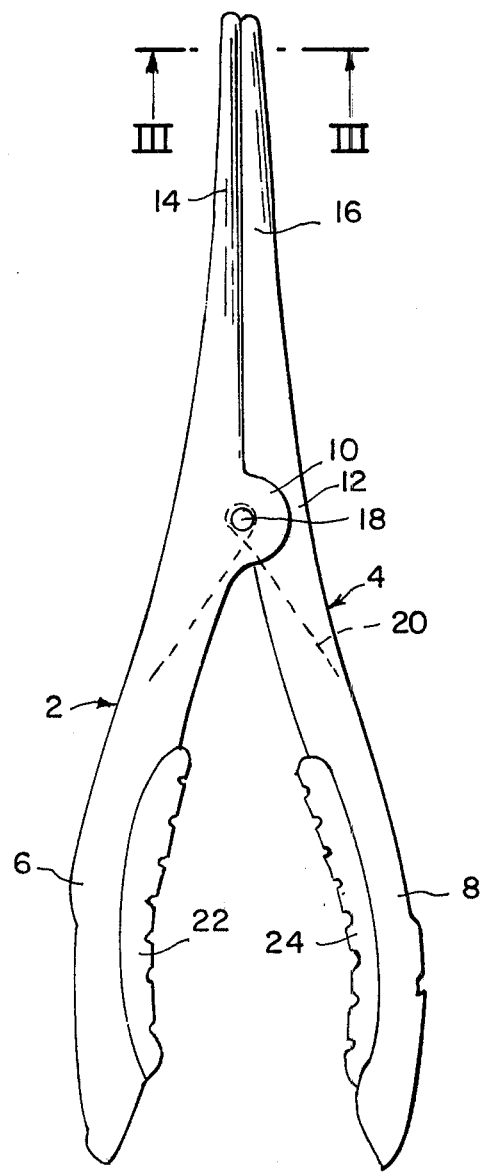
FIG. 2 is a front elevational view of the tool shown in FIG. 1 but shown in a different position.

It will be seen that the spring means 20 bias the first and second lever units 2, 4 such that the jaw portions 14, 16 are engaged with each other and the handle portions 6, 8 are removed from each other (FIG. 2). The handle portions 6, 8 are, however, movable toward one another against the pressure of the spring 20 to cause the jaw portions 14, 16 to separate (FIG. 1).

Figure 3:
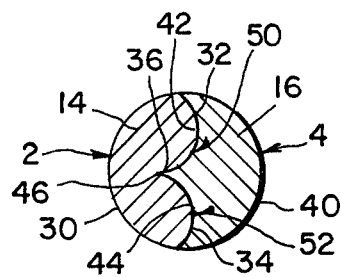
FIG. 3 is a sectional view taken along lines III—III of FIG. 2.

Referring to FIG. 3, it will be seen that the first jaw portion 14 of the first lever unit 2 has a sectional configuration including a first circular convex outside wall 30 and first and second inside walls 32, 34 which are rounded and convex and which extend at one end thereof from the first outside wall 30, each joining the other at the other end thereof to form a sharp angle depression 36 in the first jaw.

The second jaw portion 16 has a sectional configuration including a second circular convex outside wall 40 and third and fourth rounded concave inside walls 42, 44. The third and fourth inside walls 42, 44 each extend at one end thereof from the second outside wall 40 and join the other at the other end thereof to form a sharp angle protrusion 46 in the second jaw 16. The first and second inside walls form a first jaw face 50 and the third and fourth inside walls form a second jaw face 52. The first and second jaw faces 50, 52 are, as readily seen in FIG. 3, complementarily shaped and engageable with each other, the first and second outside walls 30, 40 defining in section a complete circle when the first and second faces 50, 52 are engaged.

Thus, there is defined substantially throughout the inside length of the jaw portion 14 a groove corresponding to the depression 36. In like manner, there is defined substantially throughout the inside length of the jaw portion 16 an elongated protrusion corresponding to the protrusion 46, the protrusion complementarily shaped relative to the groove, to provide useful gripping and cutting means. Additional cracking means may be brought into play by use of the cracking portions 22, 24 of the handle portions 6, 8.

In use, the operator has available the jaw portions and the cracking portions to facilitate gripping, cracking, cutting and separating various portions of shell fish.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. A shell fish tool comprising first and second lever units pivotally connected to each other, each lever unit comprising an elongated handle portion, a shoulder portion, and an elongated jaw portion, said jaw portions comprising a first jaw portion of said first lever unit and a second jaw portion of said second lever unit, said first jaw portion having a sectional configuration including a first circular convex outside wall, a first rounded convex inside wall and a second rounded convex inside wall, said first and second inside walls each extending at one end thereof from said first outside wall and each joining the other at the other end thereof to form a sharp angle depression in said first jaw, said first and second inside walls forming a first jaw face, said second jaw portion having a sectional configuration including a second circular convex outside wall, a third rounded concave inside wall and a fourth rounded concave inside wall, said third and fourth inside walls each extending at one end thereof from said second outside wall and each joining the other at the other end thereof to form a sharp angle protrusion in said second jaw, said third and fourth inside walls forming a second jaw face, said first and second jaw faces being complementarily shaped and engageable with each other, said first and second outside walls defining in section a complete circle when said first and second faces are engaged.

2. The invention according to claim 1 including spring means biasing said first and second lever units toward first positions but yieldable to permit movement of said lever units to a second position.

3. The invention according to claim 2 in which said spring means biases said first and second lever unit jaw portions and handle portions to positions in which said jaw portions are engaged with each other and said handle portions are removed from each other.

4. The invention according to claim 1 including cracker portions disposed on said handle portions of said lever units.

5. The invention according to claim 4 in which each handle portion is provided with a cracker portion and said cracker portions are opposed to each other.

6. The invention according to claim 1 in which said first and second lever units are joined by pivot means at their respective shoulder portions.

* * * * *